5 Sheets—Sheet 1.

O. COLVIN.
BEE-HIVES.

No. 193,752. Patented July 31, 1877.

WITNESSES
Robert Everitt
Jac Sheehy

INVENTOR,
Orson Colvin.
Gilmore Smith & Co.
ATTORNEYS.

5 Sheets—Sheet 2.
C. COLVIN.
BEE-HIVES.
No. 193,752. Patented July 31, 1877.
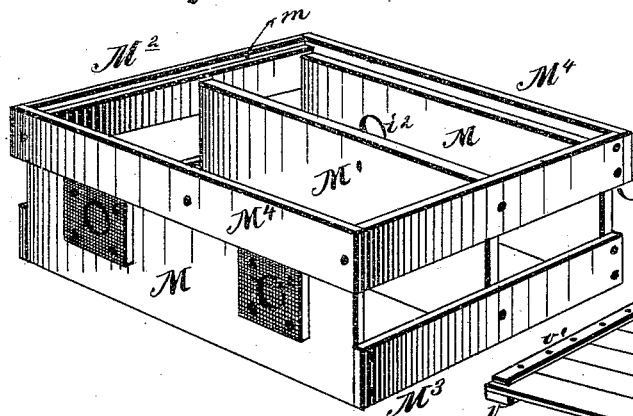
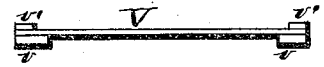
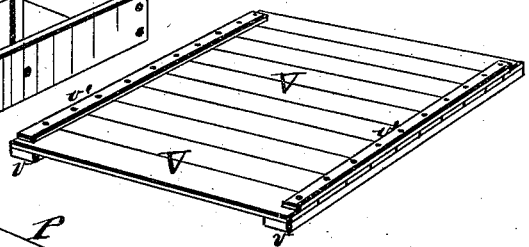
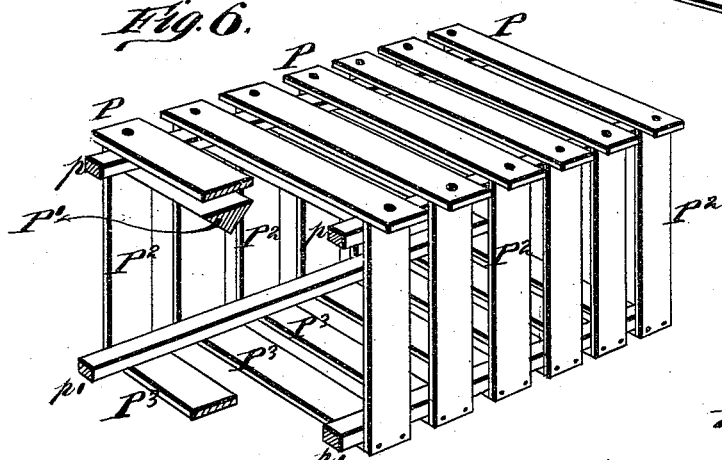
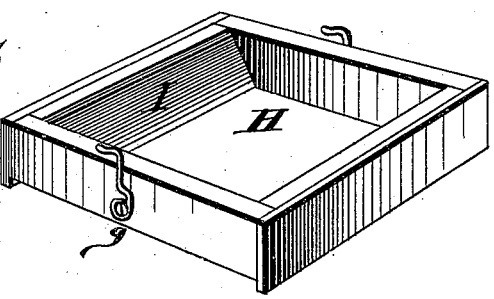
WITNESSES
Robert Everitt
James Sheehy
INVENTOR.
Orson Colvin
Gilmore Smith & Co
ATTORNEYS.

5 Sheets—Sheet 3.
O. COLVIN.
BEE-HIVES.
No. 193,752. Patented July 31, 1877.
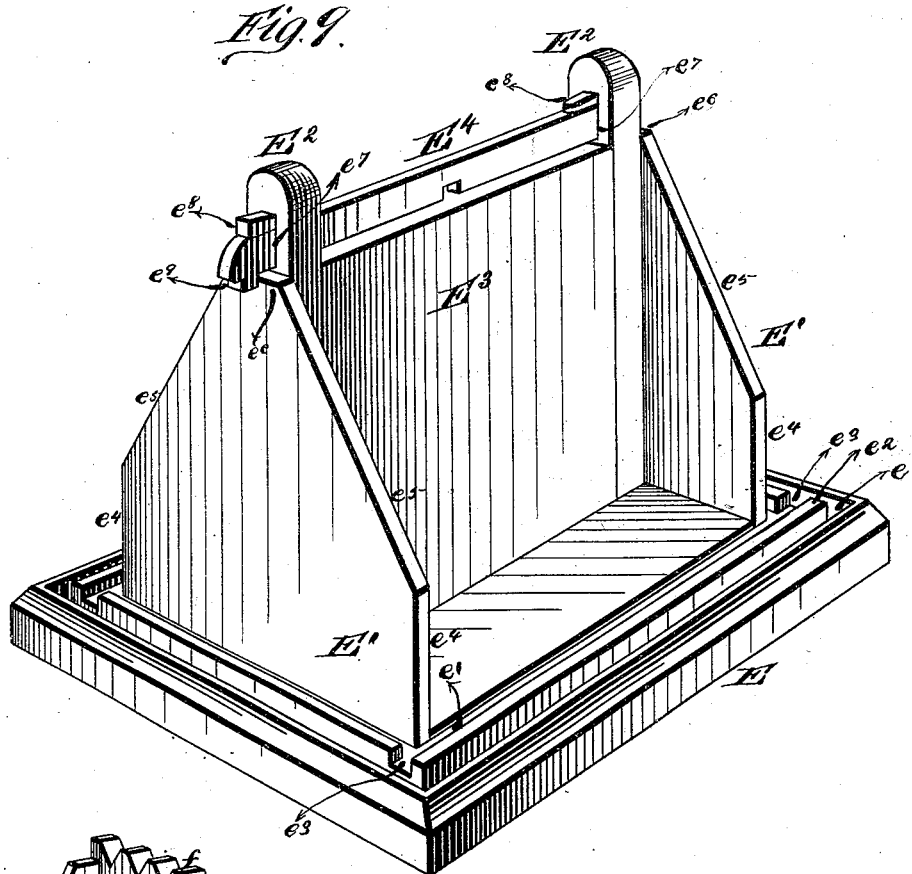
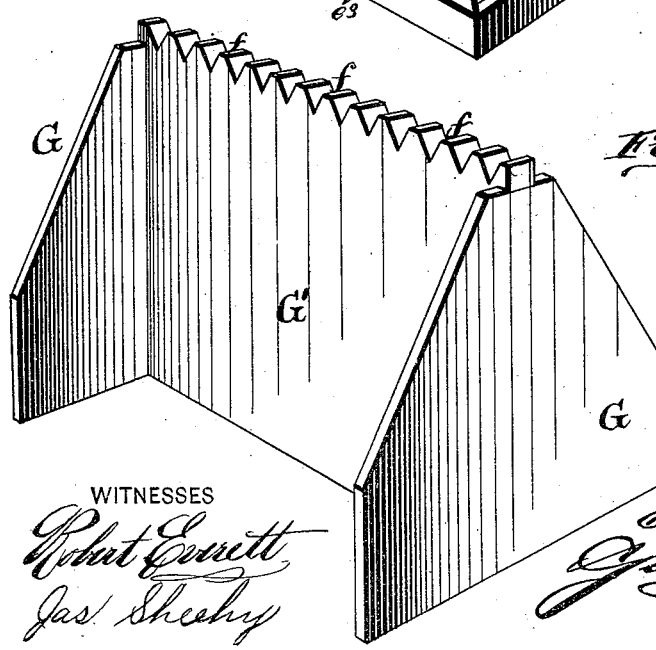
WITNESSES
Robt Everett
Jas Sheehy
INVENTOR.
Orson Colvin
Gilmore. Smith & Co.
ATTORNEYS.

5 Sheets—Sheet 4.

O. COLVIN.
BEE-HIVES.

No. 193,752. Patented July 31, 1877.

WITNESSES
Robert Everett
Jas. Sheehy.

INVENTOR.
Orson Colvin.
Gilmore Smith & Co.
ATTORNEYS.

N. PETERS, PHOTO-LITHOGRAPHER, WASHINGTON, D.C.

5 Sheets—Sheet 5.

O. COLVIN.
BEE-HIVES.

No. 193,752. Patented July 31, 1877.

WITNESSES
Robert Everitt
Jas. Sheehy

INVENTOR.
Orson Colvin.
Gilmore Smith & Co.
ATTORNEYS

UNITED STATES PATENT OFFICE.

ORSON COLVIN, OF VICKSBURG, ASSIGNOR OF ONE-HALF HIS RIGHT TO JOHN R. HAWKINS, OF KALAMAZOO, MICHIGAN.

IMPROVEMENT IN BEE-HIVES.

Specification forming part of Letters Patent No. 193,752, dated July 31, 1877; application filed May 26, 1877.

*To all whom it may concern:*

Be it known that I, ORSON COLVIN, of Vicksburg, in the county of Kalamazoo and State of Michigan, have invented a new and valuable Improvement in Bee-Hives; and I do hereby declare that the following is a full, clear, and exact description of the construction and operation of the same, reference being had to the annexed drawings, making a part of this specification, and to the letters and figures of reference marked thereon.

Figure 1:
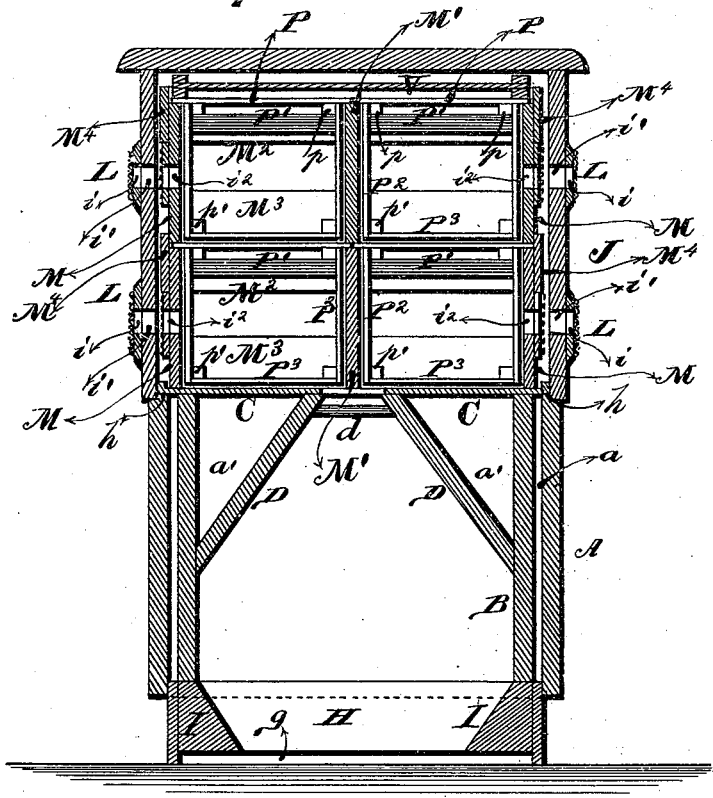
Figure 2:
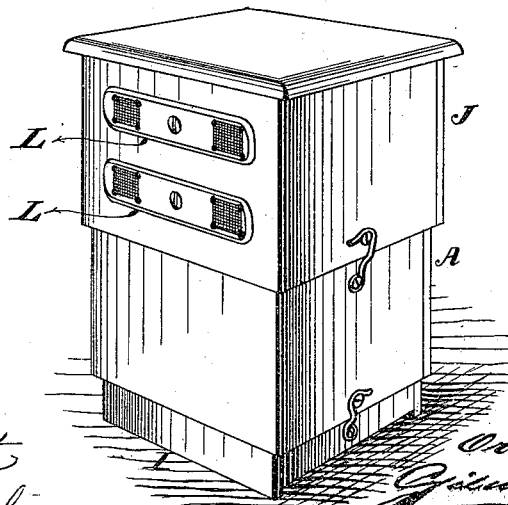
Figure 11:
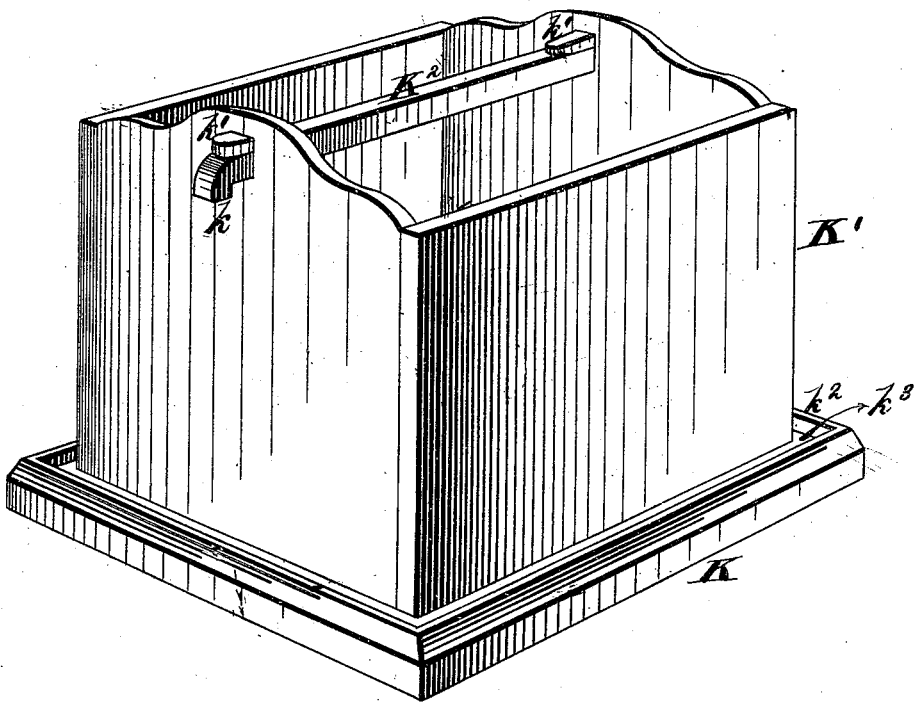
Figure 12:
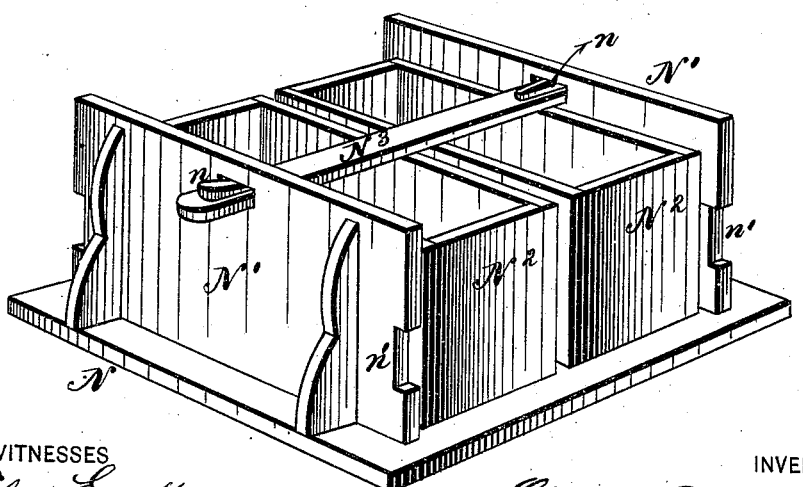
Figure 13:
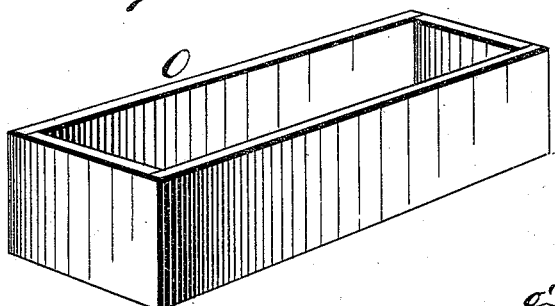
Figure 14:
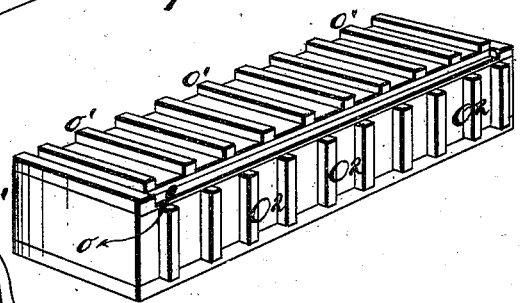
Figure 15:
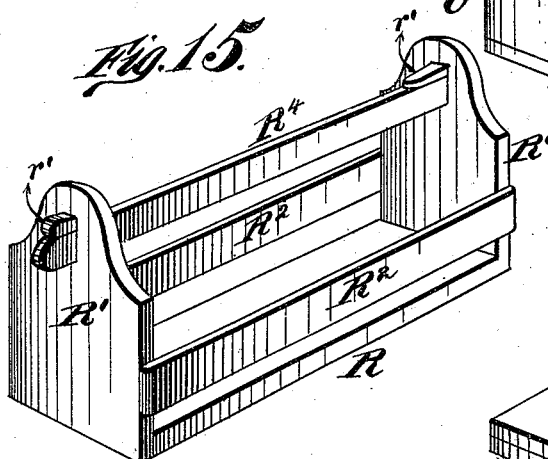
Figure 16:
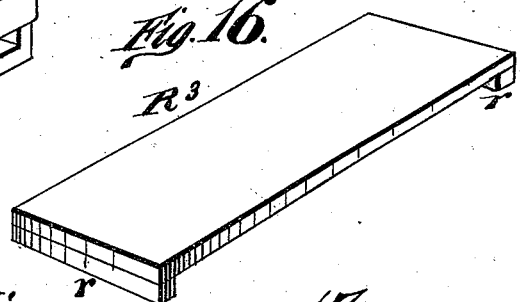
Figure 18:
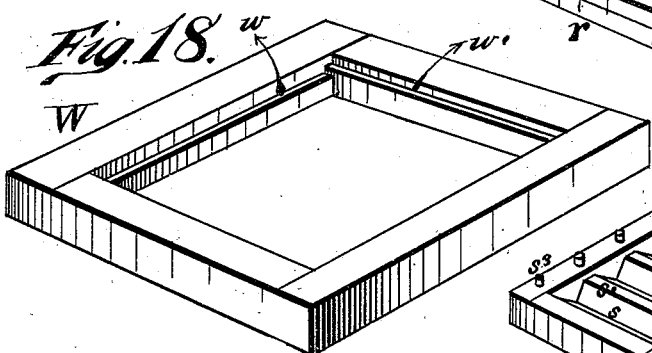
Figure 17:
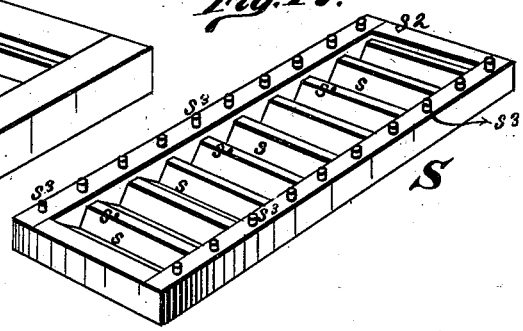

Figure 1 of the drawings is a representation of a vertical central section of my bee-hive, and Fig. 2 is a perspective view of the same. Figs. 3, 4, 5, 6, 7, and 8 are detail views. Figs. 9 and 10 are perspective views of the frame on which the hive is made, and Fig. 11 of the frame on which the brood-chambers are made. Fig. 12 shows the frame over which the honey-box cases are made. Figs. 13, 14, 15, 16, 17, and 18 represent details of the frames.

The nature of my invention consists in the construction and arrangement of a bee-hive and the frames over which the various parts of the hive are built, as will be hereinafter more fully set forth.

In the annexed drawings, which fully illustrate my invention, I have shown both the hive as constructed and the frames over which the various parts are built or made.

The brood-chamber of the hive is formed of an outer casing, A, and an interior casing, B, arranged to form dead-air chambers $a$ around all four sides, and at the top are fastened two plates, C C; and two blocks, $b\, b$, of the same thickness as the plates, are fitted between the ends of said plates, said blocks being just long enough to cover the two casings and the air-chambers at those points. The inside casing B is made about half an inch shorter at the bottom than the outside casing A, as shown.

In the top of the brood-chamber are two inclined partitions, D D, forming with the inside casing B and the top plates C C two angular dead-air chambers, $a^1\, a^1$, which are for the purpose of protecting the bees from heat and cold; and they also cut off about twenty pounds of honey—or rather a space for about that amount, more or less—which the bees have to build in square hives, and that they make no use of, thus giving the bees more time to work in the surplus-honey boxes.

Between the upper ends of the inclined partitions D D are fitted a series of wooden blocks, $d\, d$, for comb-guides, there being suitable spaces left between the blocks and between the inside casing B and the front and rear blocks.

This brood-chamber is built over two separate frames or formers in the following manner: The first frame or former is constructed of a bed or base, E, having in its upper face a groove, $e$, of suitable depth, running around and parallel with the four sides of the base. Within the area inclosed by this groove is another groove, $e^1$, running parallel with and at equal distances from the four sides of the groove $e$. The groove $e$ is made about half an inch deeper than the groove $e^1$, and a ledge or flange, $e^2$, is left between the two grooves, as shown. At the corners the two long parts of the groove $e^1$ are cut through the said flange $e^2$, as shown at $e^3$.

On the base E are secured two end pieces, $E^1\, E^1$, which coincide with the inner walls of the short parts of the inner groove $e^1$, and the front and rear edges of said end pieces $E^1$ run vertically upward from the bottom for a suitable height, and are then inclined toward the center to near the top, where a horizontal edge is formed.

In the drawing, the vertical edges are marked $e^4$, the inclined edges $e^5$, and the top horizontal edge $e^6$.

The two end pieces $E^1$ are braced and supported by means of two central vertical posts, $E^2\, E^2$, connected by a panel, $E^3$, said panel being of the same height as the highest points on the end pieces, while the posts $E^2$ extend a suitable distance above the same, and have each a mortise, $e^7$, through its upper end, for the passage of a locking-bar, $E^4$, which is fastened in said mortises by keys $e^8$. Near each end of the locking-bar $E^4$, on the under side, is a projecting tongue, $e^9$, of the same width as the flange $e^2$ on the base above described.

The four pieces of which the interior casing

B is made are placed in the groove $e^1$ of the base E, against the outer sides and horizontal edges of the side pieces $E^1$, the longer sides of the said casing projecting through the cut-outs $e^3$, so that the edges of said long sides will coincide with the inner walls of the outer groove $e$. The four sides of the inner casing B are then nailed together, and the partitions D D placed upon the inclined edges $e^5$ of the end pieces $E^1$ and nailed to the inner casing. The four pieces forming the outer casing A are now placed in the groove $e$ and nailed to each other, and the end pieces of said outer casing are also nailed to the edges of the long sides of the inner casing, thus uniting said parts firmly together, and forming the outer casing A about half an inch deeper at the bottom than the inner casing B. The locking-bar $E^4$, with its tongues $e^9$, holds the parts in position while being nailed together.

This partially-completed brood-chamber is then lifted off this first frame or former, and placed over the second frame or former, which is constructed of two side pieces, G G, connected by a panel, G', in the center. These side pieces G G are constructed of exactly the same size and form as the end pieces $E^1$ of the first frame or former. The panel G' extends above the top edges of the side pieces G G, and in the upper edge of said panel is formed a series of V-shaped notches, $f$, in which the wooden blocks or comb-guides $d$ are placed, and then nailed to the inclined partitions D D.

The plates C C and blocks $b$ $b$ are then fitted in place and fastened, which completes the brood-chamber of the hive.

H represents the bottom section of the hive, made to fit closely within the outer casing A, and the inner casing B resting upon it. This bottom section is fastened to the brood-chamber by hooks or other suitable means, and has its sides projecting below the front and rear, to form the bee-entrances $g$ $g$ at the front and rear, as shown.

Along the sides on the inside of said bottom section H are fastened side strips I I, running parallel with the inclined partitions D D, and sloping on their inner sides from the top inward and downward. The sloping movable bottom thus formed causes the bees to build the combs in a rounding shape at the bottom of the hive, so that it will require less bees to keep up the required heat for brooding.

Around the top edges of the outside casing A is formed a rabbet or shoulder, $h$, which may be provided with rubber or other suitable packing, if desired, to secure a perfectly tight joint when the top case J is placed thereon, said top case forming the outside case of the honey-chamber.

This top case J is made on a former constructed of a base, K, upon which is secured a box-like frame, $K^1$, the end pieces of said frame projecting above the sides, and having a locking-bar, $K^2$, passed through mortises therein near the top in the center. This locking-bar $K^2$ has a shoulder, $k$, on the under side near each end, and it is fastened in the mortises by keys $k^1$.

Around the edges of the base K are fastened beads or moldings $k^2$, which form a groove, $k^3$, of suitable width all around the box-frame $K^1$. The four sides of the case are placed in the groove $k^3$ against the sides of the frame $K^1$, and held in place by the locking-bar $K^2$ when they are nailed together. The case is then lifted off the former, and the top laid on and nailed fast.

On the opposite sides of the top case or cap J are two flat centrally-pivoted buttons, L L, each of which has a wire-gauze covered opening, $i$, corresponding with similar apertures $i^1$ in the case, so that, by turning said buttons on their central pivots, the openings $i^1$ in the case may be more or less or entirely covered, or entirely uncovered, so as to regulate the draft through the hive.

On top of the brood-chamber of the hive, and within the cap J, are placed two or more honey-box cases, one on top of the other. Each of these cases is formed of two parallel side pieces, M M, with a central portion, $M^1$, running parallel with them, and all connected at the ends by top and bottom cleats $M^2$ and $M^3$. The top cleats $M^2$ are thicker than the bottom cleats $M^3$, and they extend above the parts M $M^1$. In the upper edge of the top cleats $M^2$, on the inner sides, are formed rabbets or shoulders $m$, which are slightly elevated above the upper edges of the parts M and $M^1$. There are also cleats $M^4$ fastened along the sides M at the top, of the same height as the cleats $M^2$.

Each side M is provided with two wire-gauze covered openings, $i^2$, to coincide with the openings $i^1$ in the case J above described.

The honey-box case thus constructed is made over a former consisting of a base or bed, N, upon which are two vertical parallel side pieces, $N^1$ $N^1$, suitably braced, and between these side pieces are two box-like frames, $N^2$ $N^2$, the spaces between the frames $N^2$ and between said frames and the side pieces being just wide enough to admit the pieces $M^1$ and M M of the honey-box case. These pieces are held down on the bed N by a locking-bar, $N^3$, passed through mortises in the center of the side pieces $N^1$ at the top, and fastened by keys $n$. The end cleats $M^2$ $M^3$ are then nailed to the ends of the pieces M $M^1$, the position of said cleats being indicated by notches $n'$ cut in the ends of the side pieces $N^1$. The case is then removed from the former and the cleats $M^4$ nailed on, as also the wire-gauze for the openings $i^2$. Each honey-box case thus forms two separate compartments, and when one case is put on top of the other, the top case rests on the shoulders $m$ in the cleats $M^2$ of the case below. In each compartment of said cases is placed a sectional honey-box, and the openings between the cleats M² M³ of the cases are to be closed with suitable glass plates.

The sectional honey-boxes are each formed of a series of top bars, P, placed suitable distances apart, and connected by two longitudi-strips, $p$ $p$—one near each side—on the under side. To the under sides of these strips are attached comb-guides P¹, corresponding with the top bars P, and side bars P² are then attached to the ends of the comb-guides and outer sides of the strips, with the ends of the top bars P projecting beyond the side bars. The bottom is formed of bars P³ connected by strips $p'$ $p'$ at their ends. The lower ends of the side bars P² are fastened to the ends of the bottom bars P³ and the strips $p'$.

This sectional honey-box is made over several forms in the following manner:

O represents a square-cornered box of suitable dimensions, in which is fitted a solid block, O¹, having in its upper surface, along each side, a rabbet, $o$, extending nearly to the ends, as shown. On top of the block O¹ are secured a series of transverse ribs, $o'$ $o'$, at suitable equal distances apart. In the rabbets $o$ are laid the strips $p'$, and between the ribs $o'$ are laid the bottom bars P³, which fit between the sides of the box O, and said bars P³ are then, when in this position, nailed to the strips $p'$, thereby completing the bottom of the honey-box.

R is a bed-piece provided with vertical ends R¹ R¹, which are connected at the sides by strips R² R² elevated a certain distance above the bed.

Transversely through the block O¹ is made a series of mortises, corresponding in number and location with the ribs $o'$, and through said mortises are passed a number of slides, O², of the same thickness as the ribs $o'$, and of such length as to project beyond both sides of the block a distance equal to the thickness of the side bars P² of the honey-box. The bottom of the honey-box being completed, as above described, is inserted and placed on the bed R. The slides O² are inserted in the block O¹, and said block inserted and placed on top of the honey-box bottom, the ribs $o'$ then being on the under side and fitting between the bars P³, and the ends of the slides O² jutting up against the side strips R². The side bars P² of the honey-box are now inserted vertically on both sides of the block between the ends of the sides O². The top of the honey-box—completed as hereinafter described—is then laid on top of the block O¹, and on top of the same is laid a board, R³, having a cleat, $r$, at each end on the under side, fitting beyond the ends of the strips $p$ $p$, and the whole is fastened by a locking-bar, R⁴, passed through mortises in the top of the end pieces R¹ R¹, and secured by keys $r'$. The side bars P² of the honey-box are, when held in this position, nailed to the top and bottom, completing said box.

The top of the honey-box is made on a former, S, consisting of a plate formed with a series of transverse V-shaped recesses, $s$ $s$, the projections between said recesses forming, at the top, narrow horizontal surfaces. $s^1$ $s^1$, as shown. Along all four sides of the former S is formed a ledge, $s^2$, extending above the horizontal surfaces $s^1$ described, and forming, as it were, a rim around the entire former. From the top of this ledge or rim, along the sides of the former, extend a series of pins, $s^3$, which are on a line with the surfaces $s^1$, as shown. In making the top of the honey-box the triangular comb-guides P¹ are laid in the recesses $s$ $s$, the upper surfaces of said comb-guides being flush with the horizontal surfaces $s^1$, and their ends fitting against the side ledges $s^2$. The strips $p^1$ are then placed on top along said side ledges, these strips being then flush with the top surfaces of the ledges. The top bars P are then laid across the former S, between the pins $s^3$, and the various parts nailed together.

When the honey-boxes are thus completed and placed in the honey-box cases, the boxes are supported by the projecting ends of the top bars P resting upon the upper edges of the parts M and M¹ of the cases.

It will be noticed that by this construction there are spaces left between all the parts sufficiently large for the bees to pass through in all directions and for perfect ventilation.

Generally two of the comb-cases are used on top of each other, as shown, with space for the bees between the upper and lower honey-boxes.

When one case is filled it can be raised and an empty one placed underneath, so that the comb-builders, as soon as they have the top section filled with comb, can go to work in the lower set and not have to wait till the combs in the top boxes are filled with honey and are sealed before they can enter a new set of boxes, which would not only be a loss of honey, but would also cause them to fill the brood-combs below with honey that might be secured by the two sets of boxes.

By the construction of the honey-box as described, it will be seen that each card of honey is built by itself, and the cards may be easily separated, by simply cutting through the corner strips $p$ $p'$.

The top honey-box case is covered by a sweat-board composed of a series of slats, V V, placed side by side, and connected together at their ends by bottom strips $v$ and top strips $v'$.

This sweat-board performs two offices—one as a sweat-board *per se*, and the other to prevent the bees coming out when the cap is removed, as it often is, temporarily, to see how the bees are working. The sweat-board V is made in a frame, W, the side pieces of which have rabbets $w$ along their inner edges, and the end pieces have also rabbets $w'$ along their inner edges, but these latter rabbets are not so deep as those on the side pieces. The strips $v$ are laid in the rabbets $w$, and are flush with the end rabbets $w'$. The slats V are now laid across the frame on the strips $v\ v$, completely filling the frame, after which the top strips $v'$ are laid on the ends of the slats and the parts all nailed together.

In the construction of this hive a free and perfect ventilation is obtained, the inclined partitions D D forming a contracted throat at the top, creating a draft upward through the hive. The air, entering through the bee-entrances at the bottom, passes upward through the brood-chamber and honey-boxes and out through the ventilating openings $i^2$, $i^1$, and $i$, as described.

What I claim as new, and desire to secure by Letters Patent, is—

1. The inclined partitions D D, arranged in the top of the brood-chamber, in combination with the inner walls of said chamber and the top plates C, to form the angular dead-air chamber $a^1$, substantially as herein set forth.

2. The combination of the outer casing A, inner casing B, top plate C, with blocks $b$ and inclined partitions D, all constructed and arranged as described, to form the brood-chamber of a bee-hive with dead-air chambers $a\ a'$, substantially as herein set forth.

3. The combination of the bed E, having grooves $e\ e^1$, flange $e^2$, and passages $e^3$, the end pieces E $E^1$, having vertical edges $e^4$, inclined edges $e^5$, and horizontal edges $e^6$, the mortised posts $E^2\ E^2$, panel $E^3$, and the locking-bar $E^4$, with tongues $e^9$ and keys $e^8$, all constructed substantially as and for the purpose described.

4. The combination of the end pieces G G and connecting-panel $G^1$, having a series of V-shaped notches, $f$, in its upper edge, substantially as and for the purpose described.

5. The combination of the base K, box-frame $K^1$, with mortises in its end, the cleats $k^2$, groove $k^3$, and shouldered locking-bar $k^2$, with keys $K^1$, substantially as and for the purpose described.

6. The honey-box case composed of the side pieces M M, having wire-gauze covered openings $i^2$, the partition $M^1$, top cleats $M^2$, with rabbets $m$, and the cleats $M^3$ and $M^4$, all constructed and combined substantially as and for the purpose described.

7. The combination of the bed or side pieces N N, with notches $n^1$, the box-frames $N^2\ N^2$, and the locking-bar $N^3$, with keys $n$, all constructed substantially as described.

8. The solid block $O^1$, formed with rabbets O O and ribs $o'\ o'$, in combination with the box O, substantially as and for the purpose described.

9. The bed R and pieces $R^1\ R^1$, side strips $R^2\ R^2$, board $R^3$, with cleats $r$, and the locking-bar $R^4$, with keys $r'$, in combination with the block $O^1$ and slides $O^2$, substantially as and for the purpose described.

10. The former S, formed with the V-shaped recesses $s$, horizontal surfaces $s^1$, and ledges $s^2$, and provided with the pins $s^3$, substantially as described.

11. The sweat-board composed of the slots V and the top and bottom side strips $v\ v'$, substantially as and for the purpose described.

12. The frame W, formed around its inner edges with the parallel rabbets $w\ w$ and $w'\ w'$, of unequal depth, substantially as and for the purpose described.

In testimony that I claim the above I have hereunto subscribed my name in the presence of two witnesses.

ORSON COLVIN.

Witnesses:
L. F. COX,
SAMUEL HAWKINS.